(12) United States Patent
Bergström et al.

(10) Patent No.: US 7,493,119 B2
(45) Date of Patent: Feb. 17, 2009

(54) DISTRIBUTED RADIO UNITS

(75) Inventors: Anders Bergström, Mölndal (SE); Benedikt Aschermann, Wuppertal (DE); Jacob Österling, Järfälla (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 276 days.

(21) Appl. No.: 10/551,074

(22) PCT Filed: Apr. 23, 2004

(86) PCT No.: PCT/SE2004/000631

§ 371 (c)(1),
(2), (4) Date: Sep. 27, 2005

(87) PCT Pub. No.: WO2004/095873

PCT Pub. Date: Nov. 4, 2004

(65) Prior Publication Data

US 2006/0199584 A1    Sep. 7, 2006

(30) Foreign Application Priority Data

Apr. 24, 2003    (SE) .................................... 0301259

(51) Int. Cl.
*H04Q 7/20* (2006.01)
(52) U.S. Cl. .................. 455/436; 455/441; 370/331
(58) Field of Classification Search ................ 455/522, 455/442, 441, 453, 452.2, 515, 436, 502; 370/235, 329, 331, 335
See application file for complete search history.

(56) References Cited

U.S. PATENT DOCUMENTS 6,353,603 B1 * 3/2002 Kim ........................ 370/335

(Continued)

FOREIGN PATENT DOCUMENTS

WO    WO 9927747 A1    6/1999

OTHER PUBLICATIONS

Ganesh, R., et al. Coverage considerations for CDMA overlay of Rural analog sites, IN: 2000 IEEE International Conference on Personal Wireless Communications, Hyderbad, India, Dec. 17-20, 2000, pp. 288-292, Inspec An: 6977265, section I; abstract.

(Continued)

*Primary Examiner*—Sam Bhattacharya
(74) *Attorney, Agent, or Firm*—Roger S. Burleigh

(57) ABSTRACT

A method in a communication system comprising a access network with Radio Network controllers (RNC) and radio base stations (RBS or Node B) consisting of main units (MU) which performs base band signal processing and one or more radio remote units (RRUs) which converts between baseband and radio frequencies and transmits and receives signals over one or more antennas, covering cells, and one or several User equipment (UE or Phones) moving closer and closer to another cell, which said network is made aware of and then it will initiate a handover process, during which the call will be transferred from one cell to another cell within said radio base station (RBS or Node B)or to a cell in another Radio base station (RBS or Node B)in said communication network. Said handover process interact with a memory containing a list (softer handover group) of said radio remote units (RRUs) capable of doing softer handover with each other using the same Rake receiver.

11 Claims, 8 Drawing Sheets

U.S. PATENT DOCUMENTS

Figure 1:
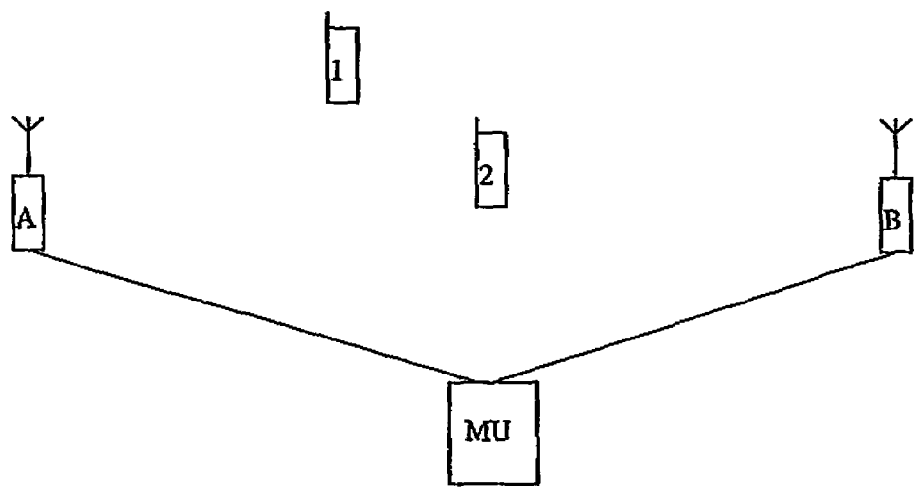

| | | |
|---|---|---|
| 6,507,741 B1 | 1/2003 | Bassirat |
| 6,618,599 B1 | 9/2003 | Son et al. |
| 7,103,376 B2 * | 9/2006 | Takano et al. .............. 455/522 |
| 2003/0161284 A1 * | 8/2003 | Chen .......................... 370/331 |

OTHER PUBLICATIONS

Swedish Patent Office, International Search Report for PCT/SE2004/000631, dated Aug. 11, 2004.

* cited by examiner

UE

UE2

DISTRIBUTED RADIO UNITS

The present invention relates to a method in a communication system comprising a access network with Radio Network controllers (RNC) and radio base stations (RBS or Node B) consisting of main units (MU) which performs base band signal processing and one or more radio remote units (RRUs) which converts between baseband and radio frequencies and transmits and receives signals over one or more antennas, covering cells, and one or several User equipment (UE or Phones) moving closer and closer to another cell, which said network sees and then it will initiate a handover process, during which the call will be transferred from one cell to another cell within said radio base station (RBS or Node B) or to cell within another Radio base station (RBS or Node B) in said communication network.

A conventional radio base station in a cellular communications system is generally located in a single location, and the distance between the baseband circuitry and the radio circuitry is relatively short, e.g., on the order of one meter. Since the RF feeder attenuation is high the antennas are mounted close to the radio circuitry, e.g. in the order of 20-100 meters. The antenna system of a conventional radio base station is therefore mounted in a limited geographical area—typically within the same mast or roof top. A distributed base station design, referred to as a main-remote design, splits the baseband part and the radio part of the base station. The main unit (MU) performs base band signal processing, and one or more radio remote units (RRUs) converts between baseband and radio frequencies and transmits and receives signals over one or more antennas. Each RRU serves a certain geographic area or cell. A corresponding optical link connects the main unit to each of plural radio remote units.

Main Remote base are an alternative of locating the RBS components in a single cabinet, size and cost can, as an example, be reduced by locating, at each cell, only those components actually required for radio transmission (referred to here as RF components).

In a WCDMA network the base station system comprising a Main Unit, for digital processing, and multiple Remote Radio Units, for radio processing. Each Remote Unit is capable of one carrier and can be mounted up to 15 km from the Main Unit. Connection is via optical fibre or coax cable. Correspondingly, the antenna system of the Main Remote RBS is therefore spread over a vast geographical area.

An example of such a system is described in U.S. Pat. No. 5,761,619.

Handover is naturally done in this kind of network and is the process of transferring a call from one cell to another. This is necessary to continue the call as the phone travels. Traditionally we have three common types of handover: hard, soft, idle.

The type of handover depends on the handover situation.

A soft handover establishes a connection with the new RBS (also called Node B) prior to breaking the connection with the old one. This is possible because WCDMA cells use the same frequency and because the mobile uses a rake receiver.

The mobile assists the network in the handover. The mobile detects a new pilot signal as it travels to the next coverage area. The new base station then establishes a connection with the mobile. This new communication link is established while the mobile maintains the link with the old RBS.

The softer handover occurs between two sectors of the same RBS. The RBS decodes and combines the voice signal from each sector and forwards the combined voice frame to the RNC.

An interesting deployment of the said Main remote architecture is to mount 2 Radio Remote Units (RRUs) for example 30 km apart along a high way facing each other. This will give cheap high way coverage.

As said the state of the art is that Softer handover is always used between cells/TRXs within an RBS. The MS reports that it has a strong C-PICH and the RNC notes that it originates from the same RBS and orders the RBS to do a Softer handover.

The RAKE receiver of the RBS has a limited window for where (in time) it accepts UE uplink signals. Any signal falling outside the window is discarded and generates interference.

For an RBS with co-located antennas this is no problem. The propagation delay difference for the UE to the two antennas is minimal—corresponding to only 10-50 meters. There is also a possible delay difference in the receiver parts but the difference is only in order of corresponding to 100 m. There also exist mechanisms within the RBS to compensate for the latter.

For an RBS with distributed receivers the propagation delay may be very different to the two antennas. If the antennas are 30 km apart and the MS requests a Softer handover 10 km from the first antenna and 20 km from the seconds, the propagation delay difference will be corresponding to 10 km. Also, the communication from the receiver parts to the common RAKE receiver will be subject to different delay due to different cable lengths. Depending on the cabling, this will easily add up to many km of corresponding air propagation delay.

It should be noted that the worst case of cable delay difference and air propagation delay difference might not occur in the same configuration.

It is obvious that the two different UE signals (to antenna 1 and antenna 2) may easily end up in the RAKE delayed more than the window—+/−3 km in current implementation.

Simulations show that the risk of dropped calls due to this is around 7% for a high way coverage solution as described above (already including equal delay calibration as described below).

One object of the present invention is to provide an improved handover method in a system with distributed radio units.

A second object of the present invention is to provide a method for a UE moving from one RRU coverage area to another should be handed over to the RRU it arrives to in the same safe manner as it do when we have traditional cell structure.

A third object of the present invention is to provide a method for receivers to perform softer handover in a RBS.

It is a further object is to achieve a delay calibration of digital transport to the Rake receiver based on distance to the area where handover is possible.

According to a first aspect of the present invention, there is provided a method in a communication system comprising a access network with Radio Network controllers (RNC) and radio base stations (RBS or Node B) consisting of main units (MU) which performs base band signal processing and one or more radio remote units (RRUs) which converts between baseband and radio frequencies and transmits and receives signals over one or more antennas, covering cells, and one or several User equipment (UE or Phones) moving closer and closer to another cell, which said network sees and then it will initiate a handover process, during which the call will be transferred from one cell to another cell within said radio base station (RBS or Node B) or to a cell in another Radio base station (RBS or Node B) in said communication network.

said handover process interact with a memory containing a list (softer handover group) of said radio remote units (RRUs) capable of doing softer handover with each other using the same Rake receiver.

said handover process is performed according to a selection from said list and said handover is done in line with the following:

If the new cell is within the said list(Softer hanover group) as another cell used by the user equipment (UE or phone) a Softer HO is initiated to the RBS as normal.

If the new cell is not within the said list (softer handover group) as another cell used by the user equipment (UE or phone) a Soft handover is initiated in the RNC or RBS.

said soft handover in the Radio base station (RBS) is a second stage maximum ratio combining or a selection combining with separate Rake receivers.

said selection among the two situations can be done with support from Radio Network controller or locally in said Radio base station (RBS).

said list (softer handover group) are made from a user equipment (UE) measured delay.

a reception time difference are used by Radio network controller (RNC) or Radio base station to calculate the relative propagation delay between the new antenna and the user equipment compared to the other active cells.

that said Radio network controller (RNC) can based on this measurement include the new cell in said list (Softer handover group) or if said Radio network controller (RNC) not is impacted the measurement is forwarded to the Radio base station (RBS) and the RBS makes this decision.

that artificial delay are stored within said Radio base station (RBS) to accomplish that the two signals from said two antennas are received within the RAKE window so that softer handover can be made.

a delay equalisation function makes the digital delay between the receiver/antenna and the RAKE receiver the same for all receivers/antennas.

the delay is optimised to maximize the number of successful softer handovers.

Advantages we the invention is primary that it is possible to make a safe handover between cells in a distributed system according to the main remote principle.

The handover process is effective even when the antennas are placed in the geography where the delay should make a handover according to the state of the art troublesome.

The problems the invention solves could have be solved by separating the data from two RRU all the way up to RNC.

Obviously this is not very efficient in terms of baseband or transmission resources. For this reason the invention also is advantageous.

Figure 2:
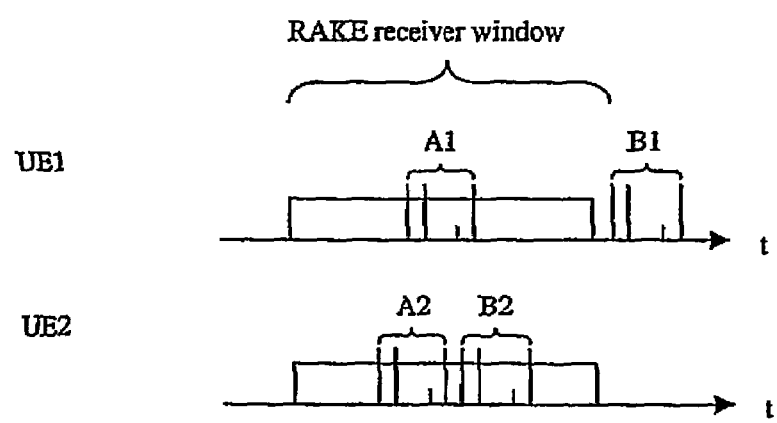

Embodiments of the invention will now be described, by way of example, with reference to the accompanying drawings, in which:

In FIGS. 1 and 2 are exemplified the air propagation delay difference and rake receiver window.

Figure 3:
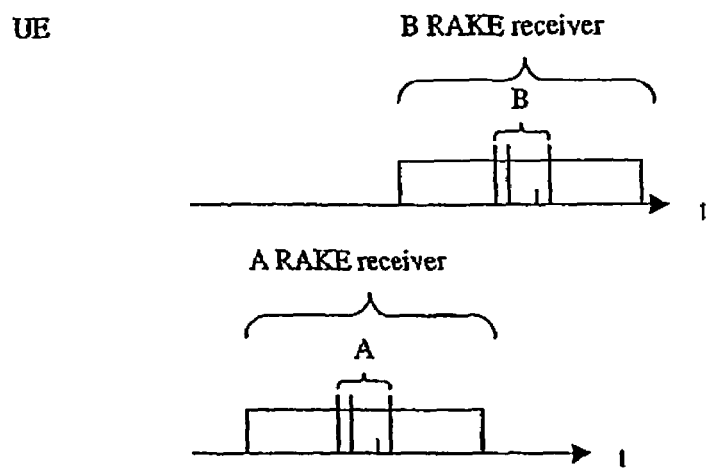
Figure 4:
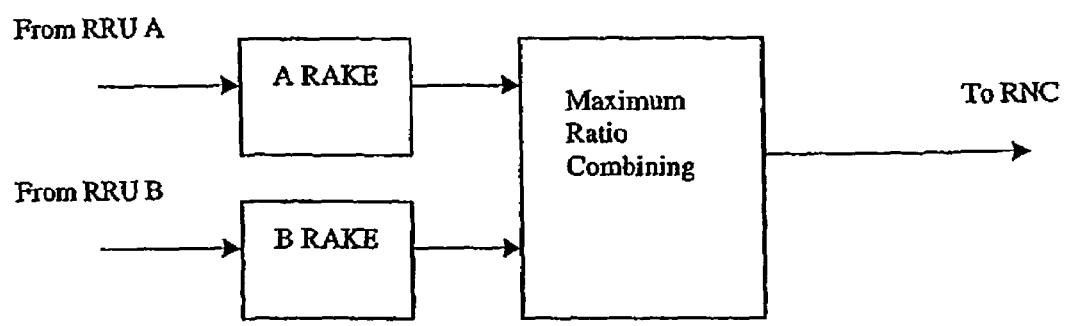

In FIGS. 3 and 4 are shown a Static solution.

Figure 5:
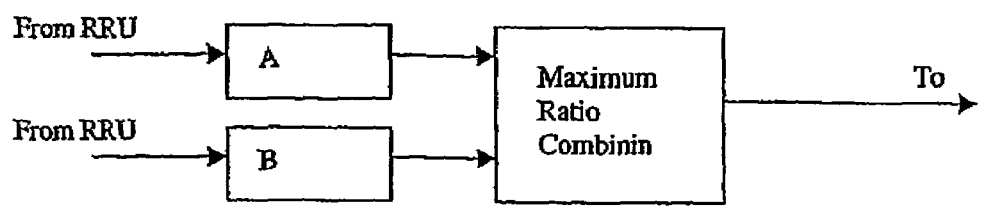
Figure 6:

In FIGS. 5 and 6 are shown a Dynamic solution.

Figure 7:
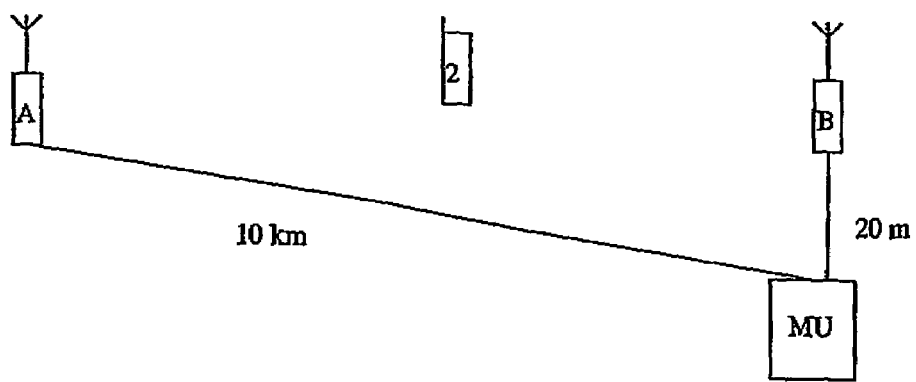
Figure 8:
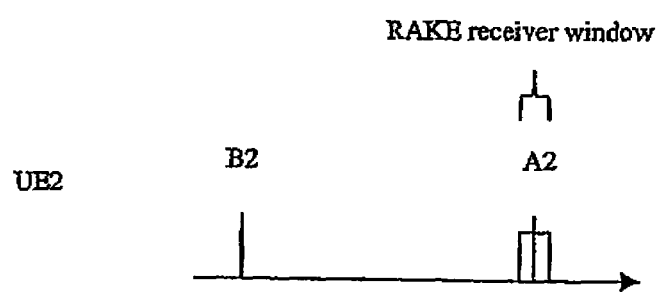

In FIGS. 7 and 8 delay calibration are shown.

Figure 9:
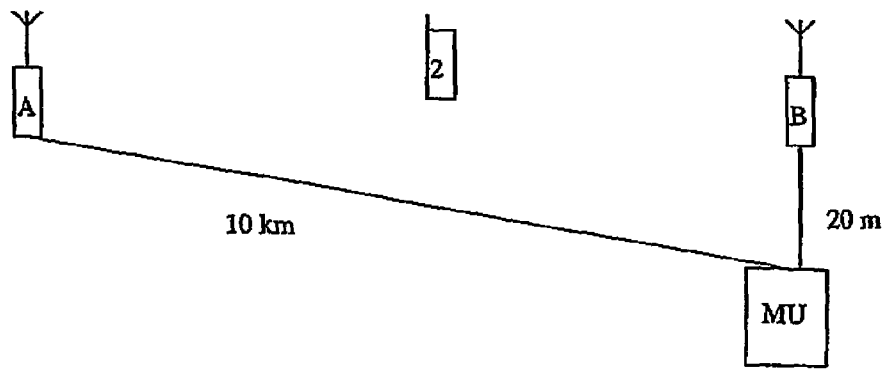
Figure 10:
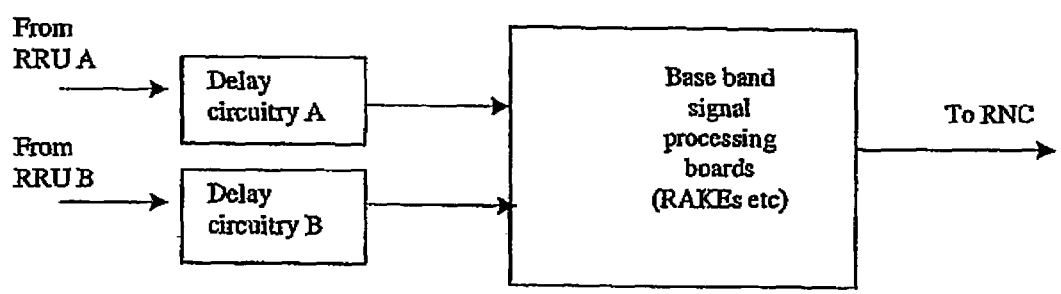

In FIGS. 9 and 10 are delay compensation shown with an equal delay solution.

Figure 11:
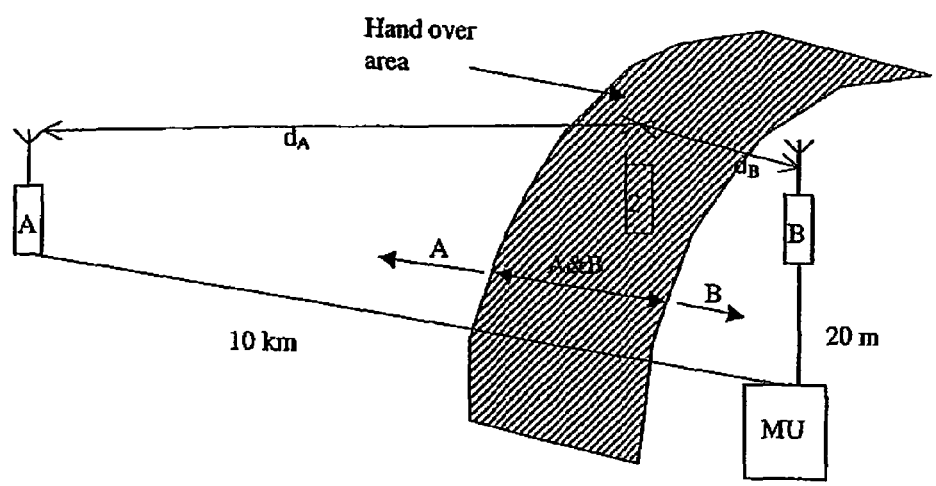
Figure 12:
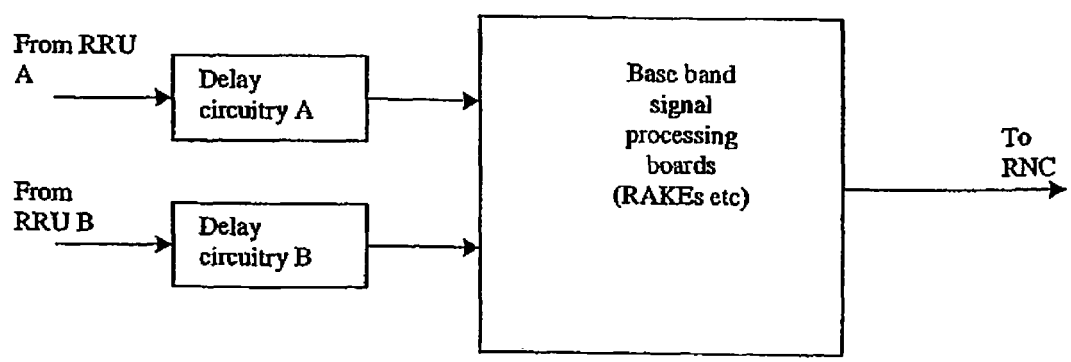

In FIGS. 11 and 12 are delay compensation shown with a optimum delay solution.

Figure 13:
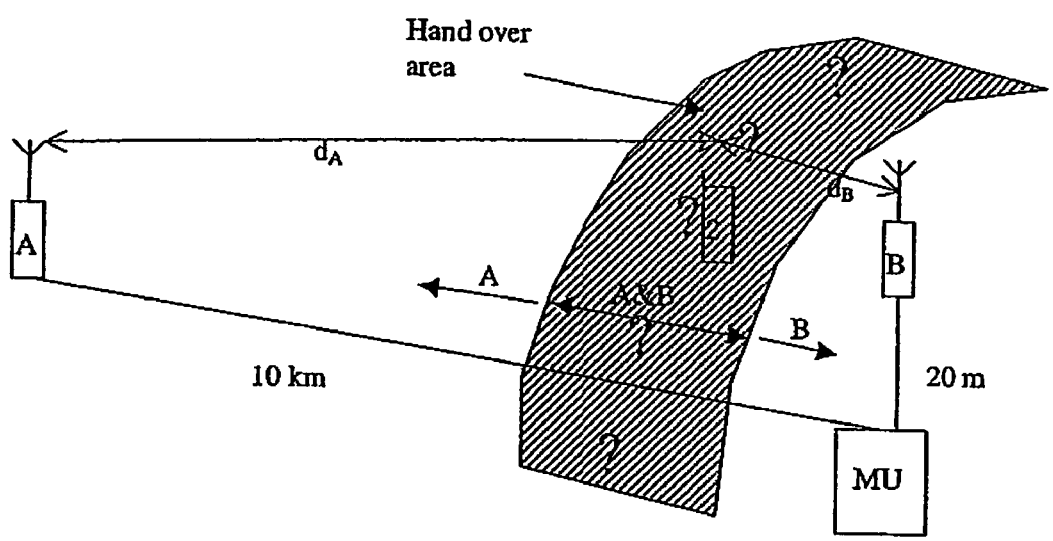
Figure 14:
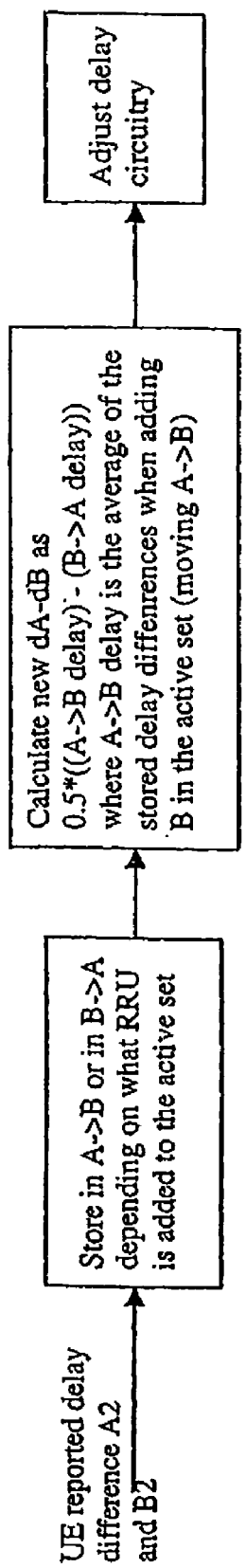

FIGS. 13 and 14 shows a self-learning optimum delay solution.

A glossary of the abbreviations used in this patent specification is set out below to facilitate an understanding of the present invention.

RNC Radio Network Controller

RBS Radio base station

Node B Radio base station in WCDMA

WCDMA Wideband code division Multi Plex

UE User Equipment

MU Main unit

RRU Radio remote unit

In FIG. 1 is shown a MU and two antennas connected to each RRU covering a highway. This is a solution that would be preferred when using the main remote concept. The antennas are faced against each other. and the antennas cover. two cells. When a mobile UE is moving, it will be travelling through different cells. If the mobile phone is not engaged in a call, it will tell the network every now and then, that it has moved to another cell. If the mobile UE is engaged in a call, the call of course needs to be maintained while the UE is moving. The process of replacing communication with one cellular radio station with another is called handover. Even while engaged in a call, the mobile phone is scanning for other cells, and reporting the signal strength received from those cells to the cellular network. When the cellular network be aware of the mobile phone moving closer and closer to another cell, it will initiate the handover process, during which the call will be transferred from one cell to another cell within the RBS or to another RBS with its cells.

A classical way of performing a soft handover consists in comparing the power level received from different base stations neighboring the mobile station. It is then decided that the mobile station be in soft handover with all the base stations so that their power level received by the mobile be in the range between the maximum power level received and that power reduced by a factor which is determined in advance. This factor may be expressed in decibels, and that is what represents the handover window. The group of base stations with which the mobile is in communication represents what is called the "Active Set" of the mobile. With other respects, since the mobile cannot support an infinite number of links, the size of the active set is limited. In this way, the impact of the soft handover is modulated by working with two parameters: the size of the active set and the handover window.

In FIGS. 1 and 2 are exemplified the air propagation delay difference and rake receiver window. References 1 and 2 are different user equipment and A and B are different RRUs.

A1 is a signal from UE1 received by RRU A and B1 is a signal from UE2 received by RRU B.

As seen from FIG. 2 and UE2 the B1 RRU falls outside the RAKE receiver window and will not be used in the signal combination. Instead, it will generate an interference.

For UE2 it is successful both A2 and B2 are inside the RAKE receiver window and will be used in the signal combination and improve the signal quality.

In FIGS. 3 and 4 are shown a Static solution: A and B are remote located, so they are put in different Softer HO Groups. The Solution is then to assign one RAKE per RRU and use a second combination stage (MRC) to combine the outcome. The drawback is that also for UE 2 two RAKEs are used.

In FIGS. 5 and 6 are shown a Dynamic solution and we let the UE delay measurement determine the number of RAKE receivers to use. We assign the number of RAKEs needed based on the UE reported delay measurement.

In FIGS. 7 and 8 delay calibration are shown. References 1 and 2 are different user equipment and A and B are different RRUs.

A1 is a signal from UE1 received by RRU A.

The problem is that even though the air propagation delay is the same to RRU A and RRU B the two signals will reach the RAKE receiver at VERY different times. This is due to the big difference in digital delay (from RF receiver to RAKE) due to the VERY different optofibre lengths.

In FIGS. 9 and 10 are delay compensation shown with an equal delay solution. References 1 and 2 are different user equipment and A and B are different RRUs. A1 is a signal from UE1 received by RRU A. Where "Delay circuitry x" is configured to make the digital delay the same for all x, i.e. all RRUs. In this example, "Delay Circuitry A" would delay the signal from RRU A 0 us and the "Delay Circuitry B" would delay the signal from RRU B 50 us (9980 m* fibre light speed).

In FIGS. 11 and 12 are delay compensation shown with a optimum delay solution. In this example, RRU B is placed in an urban area with antenna facing from a roof top to the street below. The Hand Over area from A to B is then very close to B.

Where "Delay circuitry x" is configured to make the digital Delay + the analog delay the same for all x, i.e. all RRUs when the UE is in the middle of the hand over area. In this example, "Delay Circuitry A" would delay the signal from RRU A 0 us and the "Delay Circuitry B" would delay the signal from RRU B 50 us (digital difference)+$(d_A-d_B)$*light speed in air.

FIGS. 13 and 14 shows a self-learning optimum delay solution.

The Hand Over area is usually derived from the cell planning but often it is difficult to determine the exact area.

Also, the optimum delay adjustment $(d_A-d_B)$ may differ throughout the hand over area. The optimum adjustment should be weighted against the number of subscribers for each of these relations.

The solution is to store the UE measured delay each time the UE requests a soft(er) hand over, and based on these measurements derive the optimum delay. This will truly optimise the probability for A and B sharing the same softer hand over group since the history will depend on the subscriber distribution in the hand over area.

Softer HO Groups

The solution is to form Softer HO Groups within the RBS, where each group consisting of receivers capable of doing Softer HO with each other, i.e. using the same RAKE. If a UE wants to expand its active set and the RNC grants the usage of a new cell, the following selection is done:

If the new cell is within the same Softer HO Group as another cell used by the UE, a Softer HO is initiated to the RBS as normal.

If the new cell is not within the same Softer HO Group as another cell used by the UE, a Soft HO is initiated in the RNC or RBS.

A Soft HO in the RBS is a second stage maximum ratio combining or a selection combining, but with separate RAKE receivers.

The selection among the two bullets can either be done with RNC support but also locally. in the RBS: If the RBS is assigned to take up a Softer HO the RBS checks if the new cell is within the Softer HO Group of any of the other used cells. If so, it uses the same RAKE as already allocated for that Softer HO Group. If not—a new RAKE is set up and a combining of the two outputs are made. This can be made totally transparent to the RNC.

Dynamic Softer HO Groups

A more advanced method is to evaluate the UE measured CPICH reception time difference and use it to group a cell as a Softer HO candidate or a Soft HO candidate.

The UE reports not only which new cell it wants to have a connection to but also its measured reception delay between the new cell CPICH and its own UL transmission time. Since the UL transmission time depends on the DL transmission time of the dedicated channels, the RNC or RBS can calculate the relative propagation delay between the new cell antenna and the UE compared to the other active cells.

The RNC can based on this measurement include the new cell in the Softer HO Group or not. Alternatively, the RNC is not impacted but instead the measurement is forwarded to the RBS (as today), and the RBS makes this decision.

To maximize the probability that Softer HO can be made, artificial delay should be added within the RBS to accomplish that the two signals (two antennas) are received within the RAKE window.

Normally, a delay equalisation function should be added that makes the digital delay between the receiver/antenna and the RAKE the same for all receivers/antennas. Then only the difference in air propagation delay will matter.

However, having equal digital delay will not always be the best—the goal is to have equal delay for an MS in the HO area. If antennas, output power and terrain are similar for both antennas, the HO area will be in the middle and equal delay is optimum. If, however, the antenna tilt is different, the CPICH powers are different or for any other reason the HO area is not in the middle of the sites, the delay should be adjusted for this. This can be done manually at network planning or dynamically based on the actual UE reports (optimise the delay to maximize the number of successful Softer HOs)

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for handover in a communication system, wherein said communication system includes an access network having Radio Network Controllers (RNC), Radio Base Stations (RBS) consisting of main units (MU) which perform base band signal processing, and one or more radio remote units (RRUs) which convert between baseband and radio frequencies and transmits and receives signals over one or more antennas covering cells, and one or several User equipment (UE) moving closer and closer to another cell, which said network is made aware of and then it will initiate a handover process, during which the call will be transferred from one cell to another cell within said radio base station (RBS) or to a cell in another Radio base station (RBS) in said communication network, wherein said handover process interact with a memory containing a list (softer handover group) of said radio remote units (RRUs) capable of doing softer handover with each other using the same Rake receiver.

2. The method according to claim 1, wherein said handover process is performed according to a selection from said list and said handover is performed according to the rules:

If the new cell is within the said list (Softer handover group) as another cell used by the user equipment (UE or phone), a Softer HO is initiated to the RBS as normal.

If the new cell is not within the said list (softer handover group) as another cell used by the user equipment (UE or phone), a Soft handover is initiated in the RNC or RBS.

3. The method according to claim 2, wherein said selection among the two situations can be done with support from Radio Network controller or locally in said Radio base station (RBS).

4. The method according to claim 1, wherein said softer handover in the Radio base station (RBS) is a second stage maximum ratio combining or a selection combining with separate Rake receivers.

5. The method according to claim 1, wherein said list (softer handover group) are made from a user equipment (UE) measured delay.

6. The method according to claim 5, wherein a reception time difference are used by Radio network controller (RNC) or Radio base station to calculate the relative propagation delay between the new antenna and the user equipment compared to the other active cells.

7. The method according to claim 5, wherein said Radio network controller (RNC) can based on this measurement include the new cell in said list (Softer handover group) or if said Radio network controller (RNC) not is impacted the measurement is forwarded to the Radio base station (RBS) and the RBS makes this decision.

8. The method according to claim 1, wherein artificial delay are stored within said Radio base station (RBS) to accomplish that the two signals from said two antennas are received within the RAKE window so that softer handover can be made.

9. The method according to claim 8, wherein a delay equalisation function makes the digital delay between the receiver/antenna and the RAKE receiver the same for all receivers/antennas.

10. The method according to claim 1, wherein the delay is optimised to maximize the number of successful softer handovers.

11. The method according to claim 10, wherein the delay are determined by evaluating the UE measured delay of a history of successful hand over between the related RRUs.

* * * * *

UNITED STATES PATENT AND TRADEMARK OFFICE
CERTIFICATE OF CORRECTION

PATENT NO. : 7,493,119 B2 Page 1 of 1
APPLICATION NO. : 10/551074
DATED : February 17, 2009
INVENTOR(S) : Bergstrom et al.

It is certified that error appears in the above-identified patent and that said Letters Patent is hereby corrected as shown below:

In Column 3, Line 8, delete "hanover" and insert -- handover --, therefor.

In Column 4, Line 16, delete "other. and the antennas cover. two" and insert -- other and the antennas cover two --, therefor.

Signed and Sealed this

Twenty-seventh Day of October, 2009

David J. Kappos
*Director of the United States Patent and Trademark Office*